Sept. 30, 1941.  J. M. ROPER ET AL  2,257,127
AIRPLANE FLUSH TYPE FORMATION LIGHT
Filed Nov. 1, 1940  2 Sheets-Sheet 1
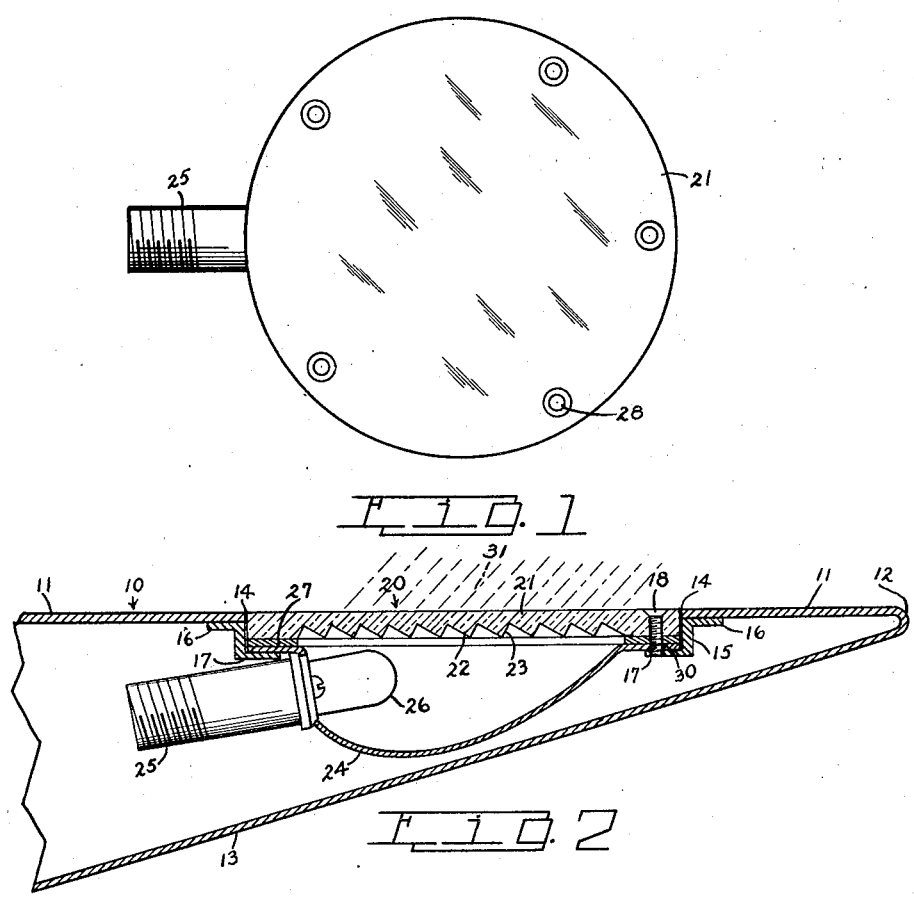
INVENTOR
ARNOLD D. DIRCKSEN
BY JOHN M. ROPER
ATTORNEY

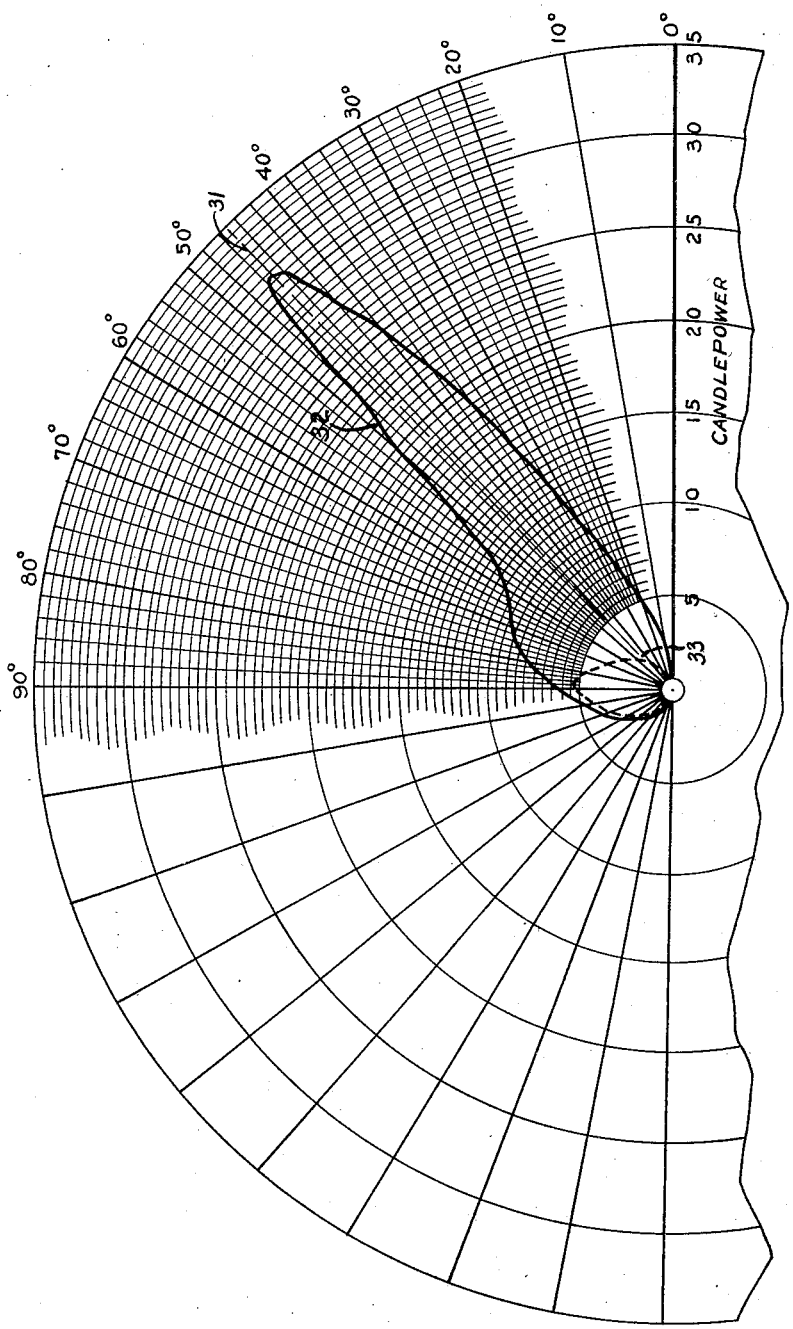

Patented Sept. 30, 1941

2,257,127

UNITED STATES PATENT OFFICE 2,257,127

AIRPLANE FLUSH TYPE FORMATION LIGHT

John M. Roper, Washington, D. C., and Arnold D. Dircksen, Dayton, Ohio

Application November 1, 1940, Serial No. 363,870

3 Claims. (Cl. 240—7.7)

(Granted under the act of March 3, 1883, as amended April 30, 1928; 370 O. G. 757)

This invention relates to an airplane flush type formation light, and has for an object to provide an improved airplane formation lighting fixture of the flush type to be placed in the upper rear surface of an airplane wing or airfoil so that the surface of the lens is substantially flush with the skin of the wing or foil.

A further object of this invention is to provide an airplane lighting fixture especially intended for use as a formation light, placed into the wing surface so that it absolutely conforms with the streamlined surface thereof, yet directs its light in a limited predetermined direction only, being especially intended for use as a formation light whereby the light will be visible only to the pilot of a following airplane when the following airplane is within a certain limited predetermined range of angles from the airplane on which the light is mounted.

Still a further object of this invention is to provide a flush type formation light for an airplane which projects its light in such a limited direction that it is visible only to the pilot of an airplane following within certain limited angles therefrom and is not at all visible either to the pilot of the airplane on which it is mounted, to a preceding airplane, or to an airplane in any other direction therefrom.

A further object of this invention is to provide an airplane formation light which is so extremely thin that it can be mounted substantially adjacent the trailing edge of an airplane wing, yet will project its beam light only in the extremely limited angle that is desirable for the purpose intended.

A further object of this invention is to provide a flush type formation light which projects a comparatively strong light in the desired angle of approximately 45° rearwardly and upwardly from the horizontal and projects an extremely weak light in a vertical angle to the surface of the lens of the light.

With the foregoing and other objects in view, the invention consists in the construction, combination and arrangement of parts hereinafter described and illustrated in the drawings, in which:

Fig. 1 is an elevational view of the light of this invention;

Fig. 2 is a sectional view showing the light mounted in the skin of an airplane wing or airfoil adjacent the trailing edge; and Fig. 3 shows the candle power distribution curve of the light of this invention.

There is shown at 10 an airplane wing or an airplane foil having its upper surface or skin 11 terminating in the trailing edge 12 and connecting to the lower skin or lower surface 13 thereof. Near the end of each wing tip there is provided a suitable round aperture 14 in the upper skin 11 of the airplane wing 10 adjacent the trailing edge 12 to receive the lighting fixture 20 of this invention. Within the skin there may be secured as by spot welding a ring bracket 15 Z-shaped in cross-section so as to provide a flange 16 which may be suitably spot welded or otherwise secured to the inside of the metal skin 11 of the wing and a second flange 17 to which may be secured, as by bolts 18, the lighting fixture 20 of this invention. This lighting fixture 20 includes a circular lens 21 of glass or suitable transparent plastic, provided on its inner surface with a plurality of integrally formed prism surfaces 22 and 23 extending longitudinally at a slight angle to the normal to the direction of flight of the aircraft, the direction of the prisms being such that longitudinal lines extended therefrom would meet to form a V somewhat to the rear of a straight line connecting the fixtures at the opposite ends of the wing.

Mounted below the lens 21 is the reflector 24 shaped substantially as shown, with its maximum spacing substantially forward of the center of the lens so as to reflect the light rays rearwardly from its foremost point. Extending through the reflector 24 at its foremost point is the lamp socket housing 25 supporting a lamp 26 between the reflector 24 and the lens 21, the reflector 24 being resiliently spaced from the lens 21 by a gasket 27 and the whole lighting fixture 20 being held in assembled position by means of the bolts 18 extending through suitably spaced holes 28 in the lens 21 and similar holes 30 in the reflector 24.

The rays projected from the lamp 26 strike the inner reflecting surface of the reflector 24 and then are reflected up to the lens 21 where they are refracted in the direction as shown, rearwardly and upwardly therefrom, the maximum light being within a few degrees of the 45° angle upwardly and rearwardly from the surface of the lens 21, as shown at 31 in Fig. 2 and as set forth in the candle power distribution curve 32 in Fig. 3.

As will be apparent from this candle power distribution curve shown in Fig. 3, the three-candle power light lamp shown at 26 projects between thirty-one and thirty-two candle powers of light at an angle of 45° upwardly and rearwardly from the lens 21 and that the maximum light is kept within very close limits, being confined to between 40 and 48 degrees at 25 candle power and to between 30 and 62 degrees at 10 candle power, all of which will be seen from the curve 32.

As shown in curve 33 the vertical distribution of the light from the lens 21 is extremely limited, being a maximum of about five candle power and diminishing rapidly to zero. With the fixtures 20 mounted near the trailing edge and opposite wing tips of the aircraft, the light is thus visible mainly to the pilot of a following airplane who is keeping his airplane at the appropriate angle upwardly and rearwardly of the leading airplane, thus enabling the flight to maintain its proper stepped-up V formation, the pilot knowing that as long as the formation light of the leading airplane is visible to him, that he is maintaining his proper angle thereto. The lens 21 may be of glass or other suitable transparent plastic material, either clear or colored, as desired, for identification and signalling purposes. By providing a differently colored lens for each airplane of a flight or for each flight as a group, each pilot will be able to immediately recognize the planes of his co-pilots and thus assist in keeping his own assigned position in the formation.

Other modifications and changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

What is claimed is:

1. A flush type airplane formation lighting fixture comprising a lens, a lamp socket, a lamp and a reflector, means for mounting said fixture with said lens set flush in the skin of an airplane, a plurality of refracting prisms integrally formed in the under surface of said lens, said reflector being secured adjacent the under peripheral edge of said lens, said reflector having its maximum spacing from said lens at a point substantially forward of the center of said lens, said lamp socket being secured through said reflector, said lamp being supported by said lamp socket between said reflector and said lens adjacent the foremost point, whereby said fixture, mounted entirely within the skin of an airplane will emit a comparatively strong beam visible only from a point rearwardly and upwardly therefrom, while beams at other angles will be comparatively weak or invisible, thereby enabling a following airplane to maintain proper formation with the first airplane by keeping within the angles of the visible strong beam.

2. A flush type airplane formation lighting fixture comprising a lens, a lamp socket, a lamp and a reflector, means for mounting said fixture with said lens set flush in the skin of an airplane, a plurality of refracting prisms integrally formed in the under surface of said lens, said reflector being secured adjacent the under peripheral edge of said lens, said reflector having its maximum spacing from said lens at a point substantially forward of the center of said lens, said lamp socket being secured through said reflector, said lamp being supported by said lamp socket between said reflector and said lens adjacent the foremost point, said mounting means comprising a ring Z-shaped in cross-section, one flange attaching to the skin, the other flange supporting said fixture, whereby said fixture, mounted entirely within the skin of an airplane will emit a comparatively strong beam visible only from a point rearwardly and upwardly therefrom, while beams at other angles will be comparatively weak or invisible, thereby enabling a following airplane to maintain proper formation with the first airplane by keeping within the angles of the visible strong beam.

3. A flush type airplane formation lighting fixture comprising a lens, a lamp socket, a lamp and a reflector, means for mounting said fixture with said lens set flush in the skin of an airplane, a plurality of refracting prisms integrally formed in the under surface of said lens, said reflector being secured adjacent the under peripheral edge of said lens, said reflector having its maximum spacing from said lens at a point substantially forward of the center of said lens, said lamp socket being secured through said reflector, said lamp being supported by said lamp socket between said reflector and said lens adjacent the foremost point thereof, the longitudinal lines of said reflector prisms extending at right angles to the foremost point of the lens whereby to refract the light rays rearwardly and upwardly away from the foremost point, whereby said fixture, mounted entirely within the skin of an airplane will emit a comparatively strong beam visible only from a point rearwardly and upwardly therefrom, while beams at other angles will be comparatively weak or invisible, thereby enabling a following airplane to maintain proper formation with the first airplane by keeping within the angles of the visible strong beam.

JOHN M. ROPER.
ARNOLD D. DIRCKSEN.